Patented Nov. 29, 1949

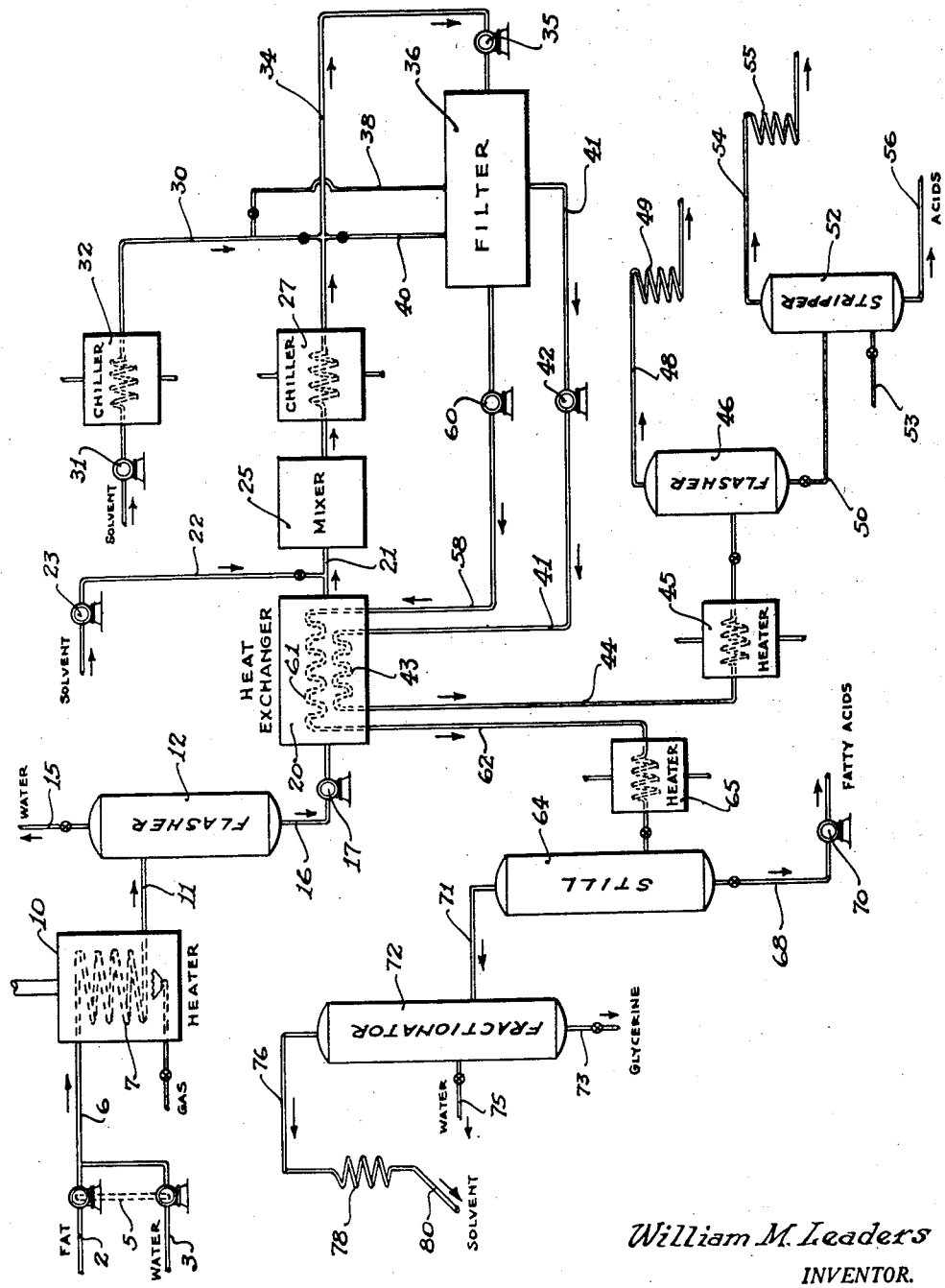

2,489,713

UNITED STATES PATENT OFFICE 2,489,713

MANUFACTURE OF FATTY ACIDS

William M. Leaders, Chicago, Ill., assignor, by mesne assignments, to Swift & Company, Chicago, Ill., a corporation of Illinois Application October 21, 1944, Serial No. 559,858

5 Claims. (Cl. 260—415)

This invention relates to the manufacture of fatty acids and has to do particularly with a continuous process for the manufacture of fatty acids from fats and oils.

In the manufacture of fatty acids, it is customary to split the fats into fatty acids and glycerine. The fatty acids are then separated from the glycerine and processed into desired fractions. The principal commercial fatty acid fractions are stearic acid and red oil, the latter comprising mainly oleic acid. These fatty acids are obtained from animal oils, such as tallow, lard and inedible greases of animal origin, including white and yellow grease.

An object of the present invention is an improved method of manufacturing stearic acid and red oil.

In recent years the development of the alkyd resin industries has created an appreciable demand for more highly unsaturated fatty acids, such as linoleic and linolenic acids. Using the invention to be described, relatively pure fractions of linoleic and linolenic acids can be manufactured using raw materials such as cottonseed oil, soy bean oil, linseed oil and other seed fats as well as marine-animal fats.

Another object of the present invention is an improved method of manufacturing unsaturated fatty acids from soft fats, such as vegetable and marine-animal oils.

The fatty acids of commerce are essentially mixtures of saturated and unsaturated acids and are usually sold on the basis of the iodine number; for example, stearic acid of commerce is essentially a 50-50 mixture of palmitic and stearic acids with an iodine number of from 1 to 10 depending on the purity and the number of steps used in the processing. Red oil contains about 70 per cent oleic acid, 15 per cent of saturated acids palmitic and stearic, and 15 per cent of more highly unsaturated acids such as linoleic and linolenic, with an average iodine number of around 90. There are minor amounts of specialty products, such as fractionally distilled mixtures of oleic, linoleic and linolenic, obtained from cottonseed oil, or soy bean oil and linseed oil, respectively, resulting from splitting of the latter oils.

A further object of the invention is to provide an improved process for manufacturing fatty acids or fatty acid fractions of any desired degree of purity and composition.

Heretofore, it has been customary to manufacture fatty acids by splitting the fats or oils with a Twitchell reagent. The fatty acids are then separated from glycerine and catalyst and the fatty acid mixture seeded and pressed to separate the hard fatty acids from the oil. Such a process is a very expensive operation because a distillation step is ordinarily required before the fatty acids may be seeded and pressed. Also, the process involves a large amount of extensive handling in the seeding and pressing operations. The fatty acids are continuously exposed to the air during this process, which takes from 1 to 3 weeks for completion. This exposure reduces their natural resistance to oxidative rancidity thereby impairing the quality for their ultimate use. The seeding and pressing operation gives a relatively rough separation of the fatty acid mixtures and in order to obtain a commercially satisfactory product, it is usually necessary to seed and press several times.

Fatty acids have also been produced commercially to some extent by continuous splitting of the fat into glycerine and fatty acids, the fatty acids being distilled prior to fractionation. The fatty acid distillate is then separated into fractions by solvent crystallization or seeding and pressing. In addition to the disadvantages of seeding and pressing, this type of operation also includes a very expensive, high vacuum, high temperature distillation of fatty acids as a purification step prior to the fractionation. Such a process is not a true continuous operation and has the disadvantages of a batch operation.

A further object of the present invention is to provide a simplified and efficient process for the continuous manufacture of fatty acids or fatty acid fractions.

The present invention contemplates broadly the continuous splitting of the fat into fatty acids and glycerine, separating a relatively hard fatty acid fraction from the parent mixture, and recovering glycerine, solvent and relatively soft fatty acids from the remaining product. I have found that the parent mixture from the fat splitting operation may be subjected to solvent crystallization prior to the removal of the glycerine. In this way, I am able to obtain glycerine in a high degree of concentration and to make efficient utilization of the original heat supplied to the fat splitting operation.

More particularly, in accordance with the present invention, the fatty acids and glycerine resulting from the fat splitting operation are mixed with a suitable solvent and the mixture chilled to crystallize a hard fraction of the fatty acids which is then removed, for example, by filtration. The mixture of solvent, glycerine and softer fraction of fatty acids is then subjected to distillation to distill the glycerine and solvent from the softer fatty acids. The vapors are then fractionated to separate the solvent and glycerine.

In the fat splitting operation, I prefer to use a concurrent system wherein proportioned amounts of fat and water are continuously passed through a heating zone. It is desirable to use an amount of water as small as possible, for example about 2½ parts of water to 1 part of fat, although 2 to 3 parts of water to 1 part of fat may be used. The temperatures may range between about 250° C. to 370° C., and preferably around 300° C. to 350° C. The pressure should be sufficient to maintain the products in the liquid phase and may range between about 2500 and 3500 pounds. The feed through the apparatus should be at a suitable rate to produce a high degree of splitting of the fat into fatty acids and glycerine. I prefer to obtain a splitting of the fat of about 95 per cent or over.

The mixture comprising glycerine, water, fatty acids and a small amount of unconverted fats is passed into an atmospheric flashing zone. The flasher is maintained under atmospheric pressure and at a temperature such that substantially all of the water is vaporized. The mixture of reaction products may be discharged through a nozzle into a low pressure flash zone wherein the water is distilled off by the sensible heat of the products. The unvaporized mixture of glycerine and fatty acids is mixed with a suitable solvent which will cause the harder constituents of the fatty acids to crystallize on cooling the solution. Ordinarily the solvent is fairly low boiling and the mixture of glycerine and fatty acids should be cooled to a temperature below the boiling point of the solvent before mixing the mixture with the solvent. The mixture may be conveniently cooled by heat exchange with other products in the system such as the hard and soft fractions separated from the filter. After the addition of the solvent, the mixture is then further chilled to temperatures sufficient to crystallize a substantial amount of the higher melting point fatty acids. Thereafter, it is usually desirable to add a further quantity of cooled solvent to lower the viscosity of the mixture and to facilitate filtering.

A number of solvents may be used, the only requirement being that the solvent shows a differential solubility between the hard and soft fractions with a decrease in temperature. The following solvents may be mentioned as suitable for this purpose; acetone, ethyl alcohol, methyl alcohol, normal propyl and isopropyl alcohols, propane, hexane, carbon disulfide, carbon tetrachloride, ethyl acetate, isopropylacetate, propyl acetate, liquid SO$_2$, methyl ethyl ketone, ethylene dichloride, beta-beta-dichlor ethyl ether, ethyl ether. The ratio of solvent to oil is ordinarily around 1 to 2 parts solvent to 1 part of oil. The temperatures used in the chilling and the ratio of solvent to oil are determined by the nature of the separation desired and the solvent used. For example, in the separation of tallow fatty acids into red oil and stearic acid, the following temperatures are suitable using the solvents indicated and a solvent ratio of two parts solvent to one part oil:

| | °F. |
|---|---|
| Acetone | 40 |
| Propane | 0 |
| Ethyl alcohol | 40 |
| Hexane | 30 |
| Methyl ethyl ketone | 40 |
| Isopropyl acetate | 15 |

The cooled mixture of solvent and crystallized fatty acids is filtered to separate the crystallized acids from the solution of oil and solvent. The crystals are washed and the product comprising the fatty acid crystals and about 50 per cent solvent is preferably pumped in heat exchange with the mixture of fatty acids and glycerine from the flasher. The preheated mixture is then flashed to separate the solvent from the higher melting point fatty acids. The filtrate from the filter comprising solvent and liquid fatty acids is also passed in heat exchange with the hot products from the flasher. The latter mixture is then subjected to distillation to vaporize the lower boiling constituents from the fatty acids. The resulting vapors are fractionated to recover the glycerine and solvent. I have found that there is sufficient difference in the boiling point between the liquid fatty acids, glycerine and the solvent so that they may be readily separated by fractional distillation.

In the filtration operation, I prefer to use a continuous rotary filter. The method of operating the filter will depend somewhat on the type of solvent used. When using solvents having a vapor pressure lower than atmospheric pressure, such as acetone, methyl ethyl ketone, ethyl alcohol, etc., the filter may be operated at atmospheric pressure or under a vacuum. With solvents having a vapor pressure greater than atmospheric at the filtering temperature, such as propane, butane, SO$_2$, etc., superatmospheric pressure may be used in the filter. Also, when using the latter low boiling solvents, self-refrigeration of the solution to be filtered may be advantageously employed.

In the washing of the crystals in the filtering operation utilizing a continuous rotary filter, chilled fresh solvent may be sprayed on the filter cake at the proper stage in the filtering cycle. This washed solvent may be recycled in the system, for example, the used washed solvent may be mixed as a diluent with the chilled feed to the filter.

The invention will be more fully understood by the following description taken in connection with the accompanying drawing wherein the single figure is a diagrammatical sketch of one type of apparatus for carrying out the process of the invention.

Referring to the drawing, the fat and water are drawn from a source of supply not shown through the lines 2 and 3 by a proportioning pump 5 and the mixture passed through the line 6 to a heating coil 7 located in a heater 10. The hot products from the heater are discharged through the line 11 to a flasher 12. The water vapors are withdrawn from the top of the flasher through the line 15. The mixture of fatty acids and glycerine is passed from the bottom of the flasher 12 through the line 16 by means of a pump 17 to a heat exchanger 20. The partially cooled products from the heat exchanger become mixed in the line 21, with solvent charged through the line 22 in which is located a pump 23. The mixture of solvent, fatty acids and glycerine is passed through a mixer 25 which is preferably of the centrifugal type. The uniform solution of solvent, glycerine and oil is then conducted through a chiller 27 which is preferably of double pipe scraped wall construction. The chilled mixture is then combined with additional solvent charged through the line 30 in which is located a pump 31 and a chiller 32. The chilled mixture is thereafter forced through the line 34 by the pump 35 to a filter 36. In actual operation the charge to the filter is preferably by gravity flow from a feed tank to which the feed is charged by the pump 35. The filter 36 may be any continuous rotary filter in which the crystals are separated as a filter cake on the filter drum. The cake so formed may be washed by a portion of the cool solvent which may be by-passed from the line 30 through the line 38. The wash solvent is preferably recycled through the line 40 to the feed line 34 where it may be utilized as a diluent for the charge to the filter. The filter cake is usually removed continuously from the filter drum, said cake comprising approximately 50 per cent solvent and is in a pumpable condition. This mixture is pumped through the line 41 by the pump 42 through the coil 43 in the heat exchanger 20, thence through the line 44 and preheater 45 to a flasher 46. In the preheater 45 the temperature is raised sufficiently high to create a substantial superatmospheric pressure and sufficiently high so that when the pressure is reduced to atmospheric in the flasher 46 the solvent will substantially completely vaporize. The vapors of the solvent are withdrawn from the top of the flasher through the line 48 and condenser 49. The resulting condensate of solvent may be re-used in the system. The unvaporized fatty acid fraction and any remaining solvent are withdrawn from the lower portion of the flasher through the line 50 to an atmospheric still or stripper 52. Steam may be introduced into the lower portion of the stripper through the line 53 to aid in the distillation. The remaining solvent is vaporized and the vapors withdrawn through the vapor line 54 and condenser 55. The higher melting point fatty acids accumulating in the lower portion of the stripper may be drawn off through the line 56 for storage.

The filtrate from the filter 36 comprising lower melting point fatty acids and solvent, is forced by the pump 60 through the line 58, the coil 61 in the heat exchanger 20 and the line 62, to a still 64. There is preferably located in the line 62 a preheater 65 wherein the charge to the still 64 may be preheated to any desired temperature by a heating medium such as steam. The hot products issuing from the preheater 65 are under substantial superatmospheric pressure and are flashed in the still 64 to vaporize substantially all materials of lower boiling point than the soft fatty acids. It is desirable to maintain the still 64 under substantial vacuum to insure complete vaporization of the solvent, glycerine and water. The fatty acids which are preferably substantially free from any solvent, water, or glycerine, are withdrawn from the lower portion of the still through the line 68 by the pump 70. The vapors, comprising water, glycerine and solvent, are conducted through the vapor line 71 to a fractionator 72. A suitable fractionator for this purpose may be a bubble tower. In the fractionator, separation between the glycerine, water and solvent is secured. A condensate of the higher boiling constituents comprising glycerine is withdrawn from the bottom of the tower through the line 73. The water may be drawn from an intermediate point in the tower through the line 75. The vapors of the solvent are conducted from the upper portion of the tower through the vapor line 76 and condenser 78. The condensate of solvent from the line 80 may be recycled in the system if desired.

*Example 1*

Choice white grease containing 4.2 per cent free fatty acid was mixed with 2 parts of water and passed through a high temperature reactor at 350° C, and 3500 pounds per square inch pressure. Approximately 98 per cent splitting occurred in this process. The material was then flashed at atmospheric pressure to substantially reduce the concentration of water present. The residue was then passed through a heat exchanger to reduce the temperature to 120° F. An equal volume of the solvent acetone was proportioned into this fatty acid, glycerine mixture and passed through a centrifugal mixer to obtain uniform solution. This solution was then chilled to 40° F. after which cold solvent amounting to ½ the original quantity used was added to the chilled slurry and the mixture filtered by means of a continuous rotary vacuum filter. The filtrate was passed through a heat exchanger and then heated to a high degree and passed into a vacuum solvent recovery system wherein substantially all the solvent and glycerine are vaporized. The vapor was conducted to a fractionating tower wherein the higher boiling glycerine was condensed from the acetone and recovered in a highly concentrated form suitable for direct purification and redistillation. The solvent vapor was condensed in a water cooled condenser and returned into the system. The fatty acid obtained from the filtrate was suitable for use as a red oil of commerce with only slightly additional processing. The filter cake obtained in the vacuum filter containing solvent and fatty acid was pumped through the heat exchanger and heater to a flasher operation at atmospheric pressure. Final traces of solvent were steam stripped from the fatty acids. The fatty acids present in the filter cake had an iodine number of 3.0 and were suitable for use as double pressed stearic acid of commerce. A yield of about 40 per cent stearic acid and about 60 per cent red oil was obtained.

*Example 2*

Alkali refined soy bean oil was mixed with 2 parts of water and passed through a splitting coil at 350° C. and 3500 pounds per square inch pressure and flashed at atmospheric pressure to reduce the moisture content. The fatty acid mixture was then passed through a heat exchanger to reduce the temperature to 120° F. and then mixed with 75 per cent of its volume of the solvent acetone. This solvent-fatty acid solution was then chilled to 0° F. and mixed with an additional charge of cold solvent to make the total solvent content equal to 2 parts by volume of the original fatty acid mixture used. This slurry was then filtered in a continuous filter. The filtrate was passed through the heat exchanger and then to the solvent-glycerine recovery system as in Example 1. The fatty acids obtained from the filtrate fraction had an iodine number of 170.0 indicating a high concentration of linoleic acid. The filter cake was passed through the heat exchanger and then to the solvent recovery equipment as in Example 1. The fatty acids obtained from this fraction had an iodine number slightly below 100 indicating a low concentration of residual linoleic acid in the precipitated fraction. This material was suitable for use as commercial red oil. A yield of about 50 per cent linoleic acid and about 50 per cent red oil was obtained.

While I have shown above the separation of the fatty acids into two fractions, it is contemplated that further fractionation of the fatty acids into a plurality of fractions may be made.

For this purpose, the softer fatty acids or filtrate separated in the filtration operation may be subjected to another crystallization operation with the same or a different solvent. Also it is contemplated that all or a portion of the filtrate with or without separation of the solvent may be recycled in the system, for example, at an intermediate stage prior to the filtration operation.

Obviously, many modifications and variations of the invention hereinbefore set forth may be made without departing from the spirit and scope thereof, and therefore, only such limitations should be imposed as are indicated in the appended claims.

I claim:

1. A process for the manufacture of fatty acids and glycerine from fats which comprises splitting the fat in the presence of water into a mixture of glycerine and fatty acids of higher and lower melting points, utilizing the sensible heat in the product of the fat splitting to remove water from the mixture, commingling the resulting mixture with an inert and volatile organic solvent having a preferential solubility for the lower melting point fatty acids and glycerine at low temperatures, cooling the resulting solution to crystallize a higher melting point fatty acid fraction and separating the crystals from the solution of solvent, lower melting fatty acids and glycerine.

2. A process for the manufacture of fatty acids and glycerine from fats which comprises subjecting the fat to hydrolysis in the presence of heat and water to produce a mixture of water, glycerine and fatty acids of different melting points, utilizing the sensible heat in the products of hydrolysis to remove water, dissolving the resulting products containing glycerine and fatty acids in an inert and volatile organic solvent having a preferential solubility for lower melting point constituents of the fatty acids at low temperatures, reducing the temperature of the solution to crystallize higher melting point fatty acids from the solution of solvent, glycerine and lower melting point fatty acids and then fractionally recovering the lower melting point fatty acids, glycerine and solvent from said solution.

3. A process for the manufacture of fatty acids and glycerine from fats which comprises hydrolyzing the fat into a mixture of fatty acids and glycerine at elevated temperatures in the presence of water, subjecting the products of hydrolysis to distillation whereby the water is vaporized by the excess heat of the hydrolysis operation, removing the vapors, cooling the unvaporized mixture of glycerine and fatty acids, adding an inert and volatile organic solvent having a preferential solubility for the lower melting point constituents of the fatty acids at low temperatures to the cooled mixture to precipitate a higher melting point fraction of the fatty acids, separating the crystals by filtration and then fractionally recovering the lower melting point fatty acids, glycerine and solvent from the remaining products.

4. A process for the manufacture of fatty acids and glycerine from fats which comprises hydrolyzing the fat into fatty acids and glycerine under high temperatures and pressures in the presence of water, flashing the reaction products whereby the water is vaporized under reduced pressure by sensible heat contained in the said products, cooling the products from the flashing operation, mixing an inert and volatile organic solvent having a preferential solubility for the lower melting point constituents of the fatty acids at low temperature with the cooled products to crystallize a higher melting point fraction of the fatty acids, filtering the mixture to separate the crystals and solvent solution of fatty acids and glycerine as cold products, utilizing cold products from the filtering operation in said cooling operation whereby the residual heat in the unvaporized products from the flashing operation is utilized to supply heat for removing solvent from the products from said filtering operation, and then fractionally recovering the lower melting point fatty acids, glycerine and solvent from said solution.

5. A process for the manufacture of fatty acids and glycerine from fats which comprises subjecting the fat and water in concurrent flow to a high temperature and pressure fat splitting operation to produce glycerine and fatty acids of varying melting point, flashing the products of reaction whereby the water is vaporized under reduced pressure by utilizing the contained heat in said products and quickly thereafter cooling the unvaporized mixture of fatty acids and glycerine, commingling with the cooled unvaporized mixture a volatile organic solvent having preferential solubility for low melting point fatty acids at low temperatures, adjusting the temperature of the resulting product to crystallize a fraction of the higher melting point fatty acids, separating the crystals from the filtrate of lower melting point fatty acids, solvent and glycerine, passing said cold filtrate in heat exchange with the hot products from the flashing operation in said cooling operation thereby heating said filtrate, and then fractionally distilling the filtrate to separate the glycerine and solvent from said low melting point fatty acids.

WILLIAM M. LEADERS.

REFERENCES CITED

The following references are of record in the file of this patent:

UNITED STATES PATENTS

| Number | Name | Date |
|---|---|---|
| 2,281,534 | Davey | Apr. 28, 1942 |
| 2,298,501 | Myers | Oct. 13, 1942 |
| 2,313,636 | Freeman | Mar. 9, 1943 |
| 2,320,738 | Jenkins | June 1, 1943 |
| 2,340,104 | Brown | Jan. 25, 1944 |